United States Patent
Ali et al.

(10) Patent No.: US 8,959,754 B2
(45) Date of Patent: Feb. 24, 2015

(54) METHOD AND APPARATUS FOR REMOVING A COIL FROM A SLOT OF A DYNAMOELECTRIC MACHINE

(75) Inventors: Syed Wajahat Ali, Scotia, NY (US); Gregory Eugene Dobbert, St. Louis, MO (US); John Matthew Sassatelli, Valley Falls, NY (US); Andrew John Tomko, Glenville, NY (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 13/534,445

(22) Filed: Jun. 27, 2012

(65) Prior Publication Data

US 2014/0000094 A1 Jan. 2, 2014

(51) Int. Cl.
*H02K 15/00* (2006.01)

(52) U.S. Cl.
CPC ................................ *H02K 15/0006* (2013.01)
USPC ............... 29/762; 29/596; 29/760; 29/281.3; 29/281.6

(58) Field of Classification Search
CPC ................................................ H02K 15/0006
USPC ............. 29/596, 764, 758, 760, 281.3, 281.1, 29/270, 281.6
See application file for complete search history.

(56) References Cited

U.S. PATENT DOCUMENTS

| | | | |
|---|---|---|---|
| 4,016,639 A | | 4/1977 | Dombrowski et al. |
| 4,137,101 A | * | 1/1979 | Stock .................. 29/22 |
| 4,218,818 A | * | 8/1980 | Panzica .......................... 29/762 |
| 4,621,850 A | | 11/1986 | Wiersema et al. |
| 4,694,716 A | * | 9/1987 | Sakamoto ........................ 83/112 |
| 4,993,287 A | * | 2/1991 | Carpenter et al. ............. 81/9.51 |
| 5,001,828 A | * | 3/1991 | Missman ......................... 29/732 |
| 5,075,959 A | | 12/1991 | Keck et al. |
| 5,297,327 A | * | 3/1994 | Waldsmith .................... 29/403.3 |
| 5,517,750 A | * | 5/1996 | Eddy .............................. 29/762 |
| 5,765,727 A | * | 6/1998 | Masley ............................. 225/3 |
| 6,047,453 A | * | 4/2000 | Matsudome ................. 29/33 M |
| 7,818,872 B2 | | 10/2010 | Dailey et al. |
| 8,745,834 B2 | * | 6/2014 | Ford et al. ..................... 29/403.4 |
| 2011/0030204 A1 | | 2/2011 | Dailey et al. |

* cited by examiner

*Primary Examiner* — Peter DungBa Vo
*Assistant Examiner* — Kaying Kue
(74) *Attorney, Agent, or Firm* — James W. Pemrick; Ernest G. Cusick; Frank A. Landgraff (57) ABSTRACT

An apparatus is provided comprising a base frame having a turntable, and a vertical section configured to be mounted on the turntable via a slidable mounting platform. The vertical section has a tapered wedge configured to move up and down the vertical section. The turntable is configured to rotate at least 360 degrees, and the vertical section is configured to move in a radial direction with respect to a center of rotation of the turntable.

7 Claims, 8 Drawing Sheets

FIG. 9

METHOD AND APPARATUS FOR REMOVING A COIL FROM A SLOT OF A DYNAMOELECTRIC MACHINE

BACKGROUND OF THE INVENTION

The method and apparatus described herein relates generally to removing a coil from a slot of a dynamoelectric machine. More specifically, the method and apparatus relates to the use of a wedge shaped member to remove the coil from the slot.

A typical motor is comprised of an armature that rotates within a fixed stator. The stator includes a core of stacked, insulated, iron laminations, with windings (or coils) of insulated copper conductors that fill slots in the core. In some motors the windings (or coils) are vacuum pressure impregnated (VPI) into the slots. This method results in a very secure installation method. Unfortunately, the VPI method also makes removal of the windings difficult and potentially problematic.

Motors may fail for various reasons. One typical cause is the degradation of the stator winding insulation. This degradation may be caused by repeated motor overheating, extreme one-time heating (possibly caused by loss of one of the three electrical phases), or water entering the motor. Normally, failure due to breakdown of stator winding insulation does not damage the core, and the core can be salvaged and rewound (and subsequently reused) if the old winding is carefully removed.

One known method for removing the windings from the stator includes attaching a strap or chain to the end of a winding, and then pulling on the winding to remove it. This approach has the potential to damage the core, as an "even" pull cannot always be guaranteed. The chain or strap used to pull on the winding may also break due to the extreme stress, and this can potentially create a hazardous condition for nearby workers. Another known method employs a large oven to heat and "burn-out" the windings. This approach creates environmental concerns and uses a large amount of energy. In addition, the high temperatures required also negatively affect the stator core and reduce the number of times it may be rewound.

It would be desirable, if a safer, environmentally friendly, less damaging and more economical method could be found for removing windings from a slot without damaging the core.

BRIEF DESCRIPTION OF THE INVENTION

In an aspect of the present invention, an apparatus is provided comprising a base frame having a turntable, and a vertical section configured to be mounted on the turntable via a slidable mounting platform. The vertical section has a tapered wedge configured to move up and down the vertical section. The turntable is configured to rotate at least 360 degrees, and the vertical section is configured to move in a radial direction with respect to a center of rotation of the turntable.

In another aspect of the present invention, an apparatus is provided comprising a base frame having a turntable, and a vertical section configured to be mounted on the turntable via a slidable mounting platform. The vertical section has a tapered wedge configured to move up and down the vertical section. The tapered wedge has a first surface forming a first angle with a wedge base surface and a second surface forming a second angle with respect to the wedge base surface. The second angle is greater than the first angle. The turntable is configured to rotate at least 360 degrees, and the vertical section is configured to move in a radial direction with respect to a center of rotation of the turntable.

In yet another aspect of the present invention, a method is provided for removing a stator coil in a stator core of a dynamoelectric machine, the method comprising the steps of: providing an apparatus having a base section and a vertical section, the base section configured for supporting the stator core; placing the stator core on the base section so that at least a portion of the vertical section is inside the stator core; aligning a wedge connected to the vertical section with a stator slot; driving the wedge along the stator slot to remove the stator coil. The aligning step may also include rotating a turntable on the base section and sliding a slidable mounting platform connected to the vertical section to align the wedge with the stator slot.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

A dynamoelectric machine is defined as any machine that converts mechanical energy to electrical energy, or electrical energy into mechanical energy. Accordingly, motors and generators are non-limiting examples of dynamoelectric machines.

Figure 1:
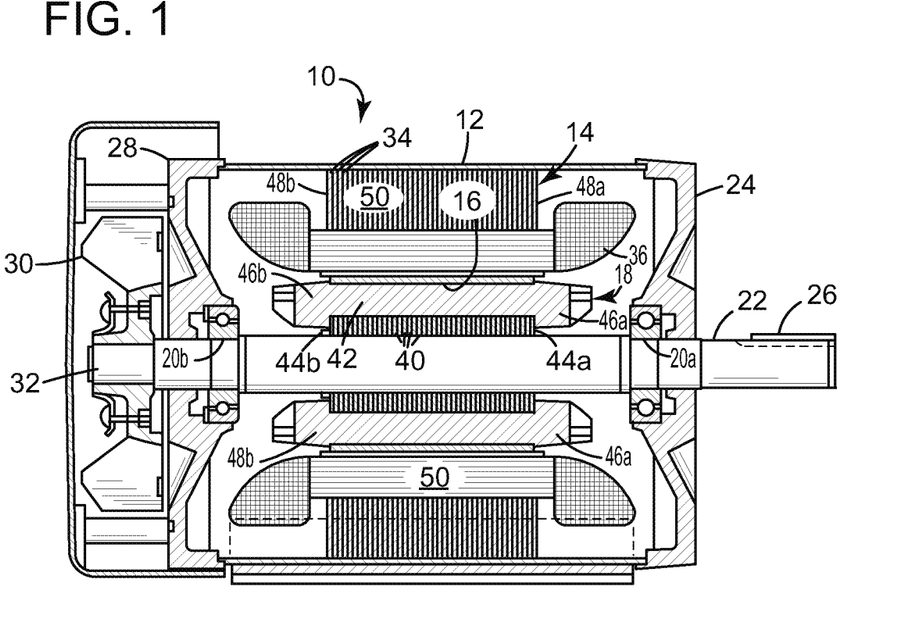
FIG. 1 illustrates a side view, in section, of a dynamoelectric machine.
Figure 2:
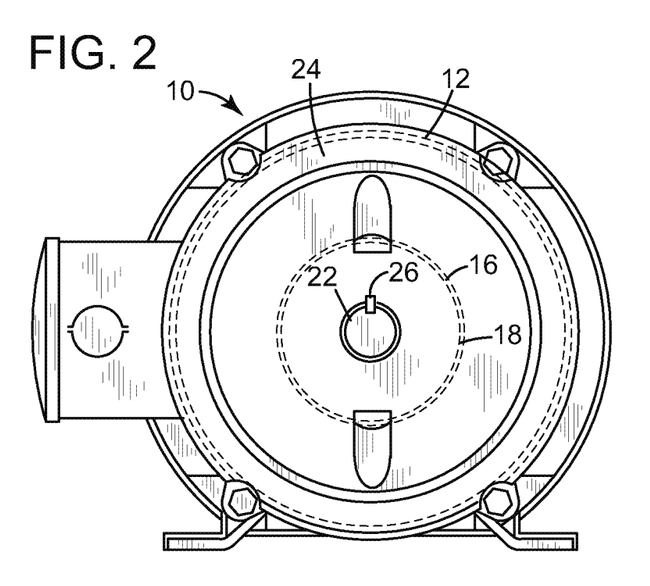
FIG. 2 illustrates a front view of the dynamoelectric machine shown in FIG. 1.

FIG. 1 shows a side view, in section, of a dynamoelectric machine 10, which may comprise a motor and/or a generator. A front view of the dynamoelectric machine 10 is shown in FIG. 2. One non-limiting example of dynamoelectric machine 10 includes a generally cylindrical outer casing 12, and a generally cylindrical stator 14 fixed coaxially within the outer casing 12 and having a coaxial bore 16. A rotor 18 is supported by suitable bearings 20a, 20b at the front and the back of casing 12, to extend axially within the bore 16 and for rotational movement about the bore axis. In the particular example shown, a shaft part 22 of the rotor 18 extends axially from a front end shield 24 of the machine 10, and may have a key 26 projecting radially outward from a recess cut axially a certain distance from the front of the shaft part 22. Key 26 serves to lock the shaft part 22 into a corresponding key way cut in a load or drive member (not shown), to which rotational motive power is to be supplied by or input to the dynamoelectric machine 10.

A back end shield 28 together with the casing 12 and the front end shield 24 serve to contain and protect stator 14, rotor 18 and associated conductive windings. In the example shown, a machine cooling fan 30 is mounted on a rotor stub part 32 which extends outside the back end shield 28, and directs an air current flow over the casing.

As shown in FIG. 1, the stator 14 is comprised of a stack of lamination plates 34 of ferromagnetic material. The lamination plates 34 are stacked face-to-face and are held together to form a core by any of various means well known in the art. A number of slots extend along the axial length of the stator 14, and project radially from the bore 16. These stator slots accommodate stator windings 50 (or stator coils 50) that have end turns 36 at axial end faces 48a, 48b, parts of which are shown in FIG. 1.

As shown in FIG. 1, the shaft part 22 of the rotor 18 extends axially from the machine casing or housing 12 and has a stack of rotor laminations 40 fixed coaxially on the shaft part 22 intermediate the front and back bearings 20a, 20b. Sets of conductive bars 42 pass through a number of axially extending slots formed in the rotor 18 near the outer periphery of each of the laminations 40. The bars 42 are shorted to one another at the axial ends 44a, 44b of the rotor lamination stack by a set of end rings 46a, 46b.

It will be understood, however, that although descriptions and dimensions for one dynamoelectric machine are disclosed herein, the invention can be practiced and applied to machines of various types (e.g., motors or generators), different sizes and different proportions.

Figure 3:
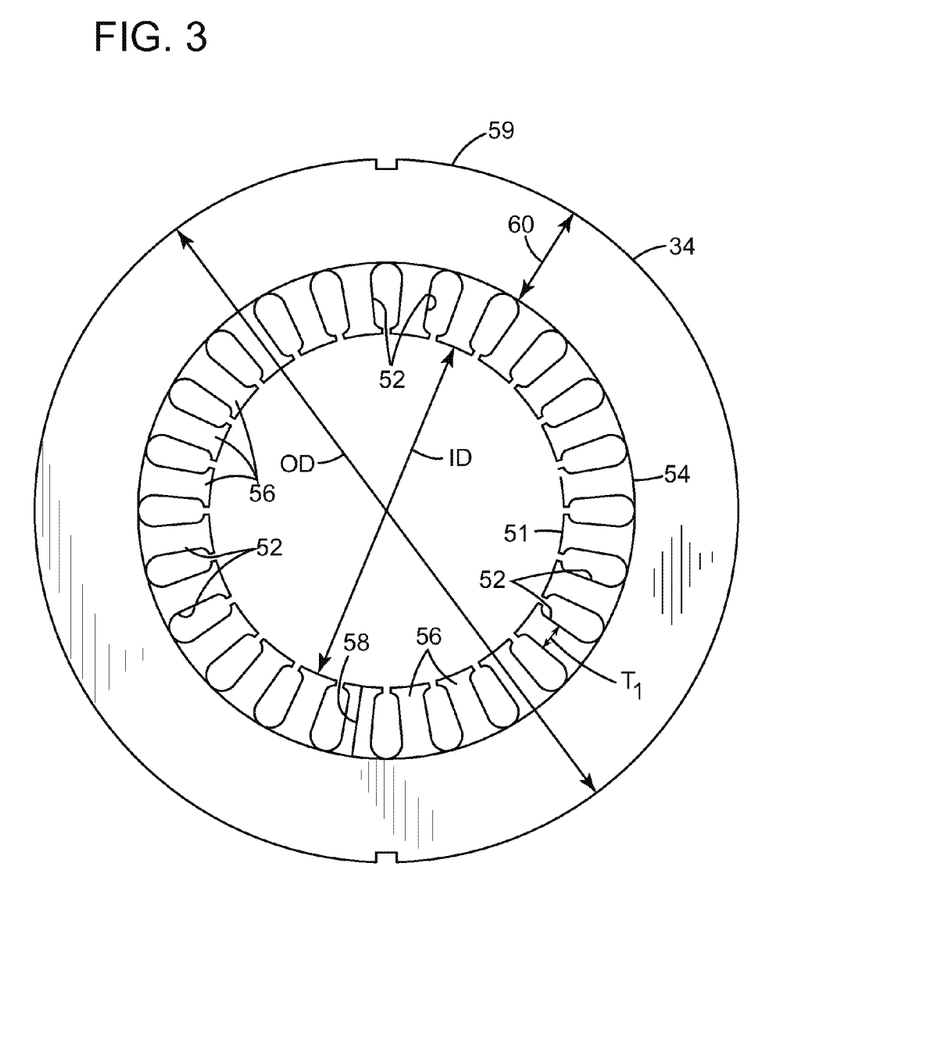
FIG. 3 illustrates and end view of a stator plate lamination.

In FIG. 3, a stator plate lamination 34 comprises a flat annular plate of ferromagnetic material having an outer diameter "OD" and a generally circular bore opening 51 of a certain inner diameter "ID". The lamination plate 34 has a number which is 24 of equally circumferentially spaced slot openings 52 extending radially from an intermediate circumference 54 to form the number of teeth 56 which extend radially to the bore opening 51. In the embodiment of FIG. 3, the plate lamination 34 is a stator lamination so that the bore opening 51 defines one boundary for a stator-rotor air gap and a bore for receiving the rotor. The width of each stator tooth 56 is designated at $T_1$.

The slot openings 52 are formed to contain one or more stator windings which extend axially through the stator 14 when like ones of the lamination plates 34 are stacked face-to-face with corresponding slot openings 52 substantially aligned to communicate with one another. In the assembled dynamoelectric machine 10 of FIGS. 1 and 2, the stator windings are arranged to correspond to an n (e.g. n=2, or 4, or 6, etc.) pole operating configuration for the machine 10. When the stator windings are connected to an outside electrical source, magnetic flux is produced next to the substantially aligned air gap peripheries or the stacked lamination plates 34 to interact with the conductive bars 42 of the rotor 18.

The annular lamination plate 34 in FIG. 3 includes a tooth portion 58 defined by the teeth 56 between the intermediate circumference 54 and the air gap periphery. The remainder of the lamination plate 34 is continuous between the intermediate circumference 54 and the outer periphery 59 to define a yoke portion 60 of the lamination plate 34.

Figure 4:
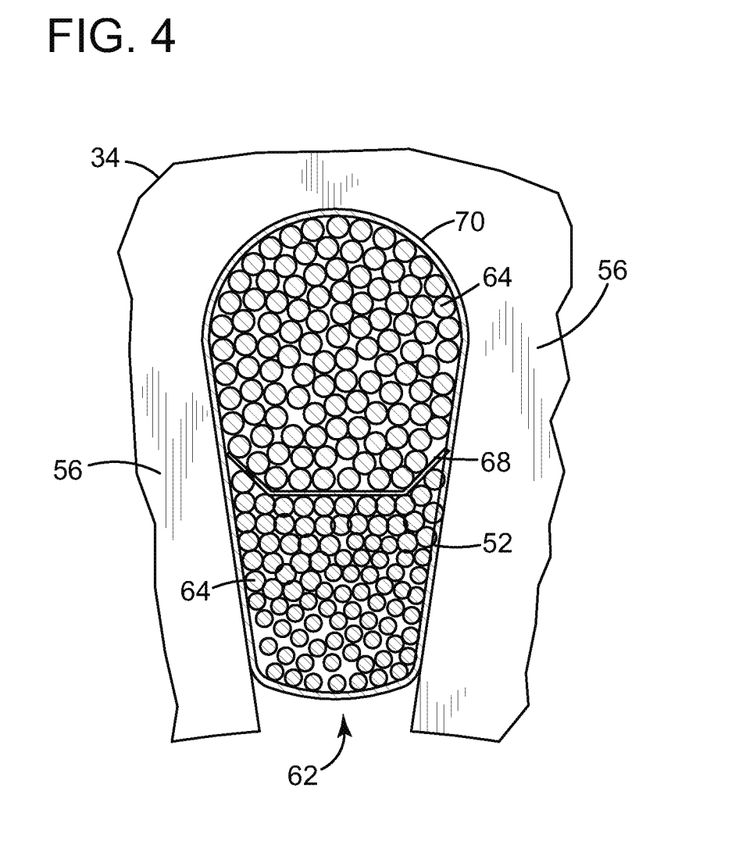
FIG. 4 illustrates an enlarged view of a part of a stator plate lamination.

FIG. 4 is an enlarged view of a part of the stator plate lamination 34. Specifically, a single slot opening 52 is shown surrounded by adjacent teeth 56. As is known, mouth 62 may be sufficiently wide to allow individual conductors 64 forming the stator winding 50 to be inserted in the opening 52 through the mouth 62 when the machine 10 is assembled. In other examples, the entire stator winding 50 may fit through mouth 62. To electrically separate individual stator windings, an insulating winding separator 68 may be positioned as shown in FIG. 4 in the stator slots, and an insulating film 70 positioned against the walls of the stator slots prevents arcing or short circuiting of individual conductors 64 with the material of which the laminations 34 are made.

Figure 5:
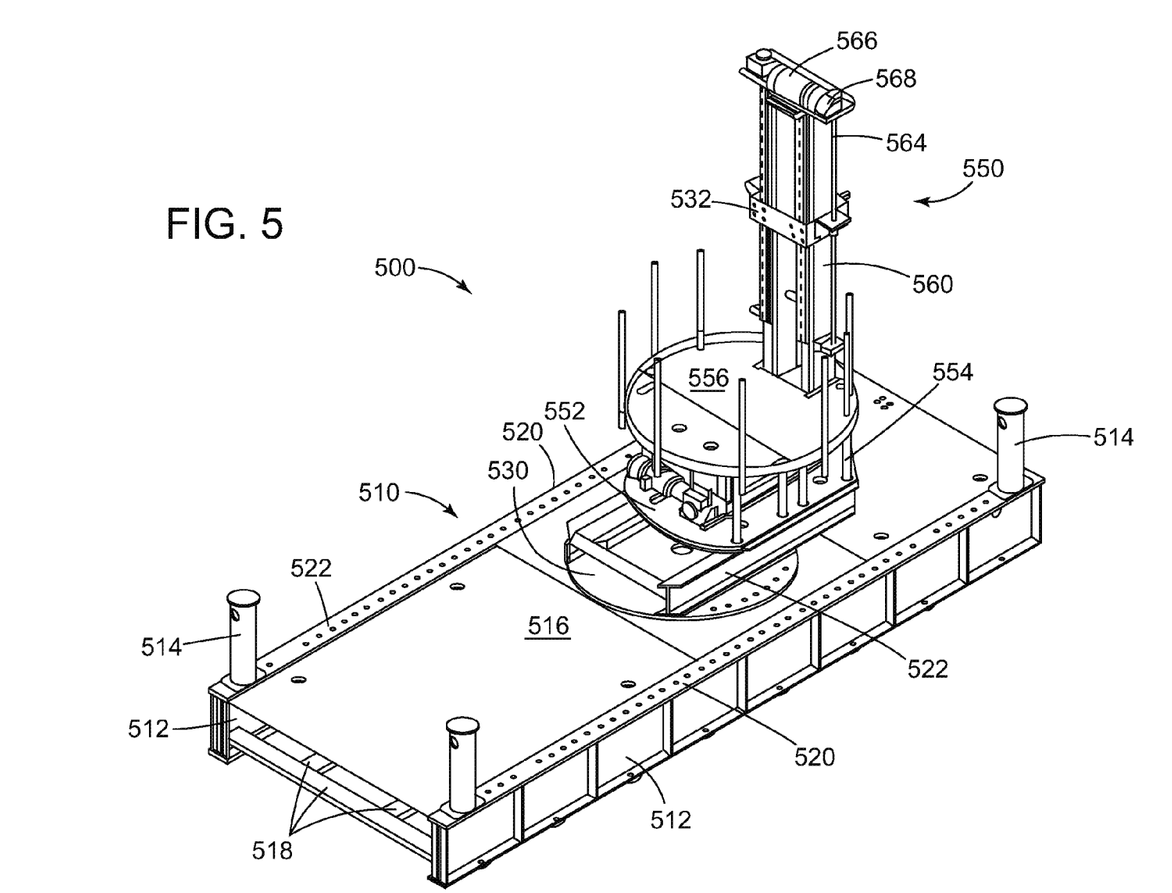
FIG. 5 illustrates a perspective view of an apparatus that can be used to remove a stator coil, according to an aspect of the present invention.

FIG. 5 illustrates a perspective view of the apparatus 500 that can be used to remove a stator winding or stator coil 50. The apparatus 500 includes two main components, a base frame 510 and a vertical section 550. The base frame 500 supports the stator core and may be comprised of support members 512, such as I-beams, a plurality of support posts 514 and support surface 516. Additional reinforcing members 518 may also be included for structural rigidity. Further, top rails 520 may include a plurality of holes 522 or other suitable means for securing posts 514 at a variety of positions. This provides an adjustable feature to the base frame 510, so that a variety of different sized stator cores may be supported by posts 514 and base frame 510. Base frame 510 may also include turntable 530, which can rotate around 360 degrees. The turntable 530 also includes turntable support rails 532 for mounting and support of vertical section 550.

The vertical section 550 includes a slidable mounting platform 552 that is slidable mounted onto the turntable support rails 532. The slidable mounting platform 552 permits the vertical section 550 to be moved in a radial direction with respect to the rotation center point of turntable 530. A plurality of support columns 554 support a working platform 556, which may be used by technicians during a winding removal operation. A vertical column 560 supports a tapered wedge (not shown in FIG. 5) mounted to a wedge mount 562. The wedge mount 562 is driven up and down vertical section 550 by two jack screws 564 that are driven by a motor 566 and gearbox 568.

Figure 6:
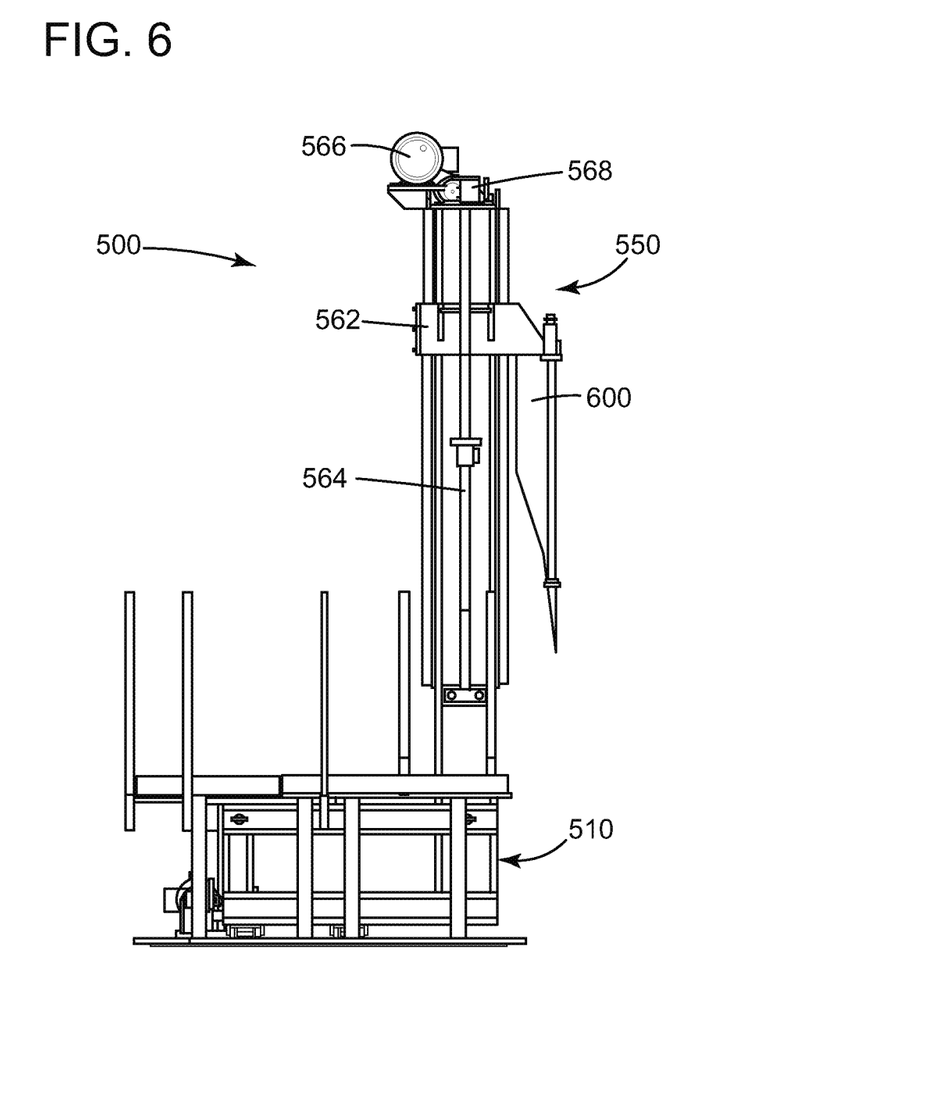
FIG. 6 illustrates a side view of the apparatus that can be used to remove a stator coil, according to an aspect of the present invention.

FIG. 6 illustrates a side view of the apparatus 500. The wedge 600 is secured to wedge mount 562. In this example, two jack screws 564 (only one shown in FIG. 6) have spiral threads that engage with a female opening in wedge mount 562. As the jack screws 564 are rotated, the wedge mount is driven up or down vertical section 550. FIG. 6 shows one jack screw 564 facing the viewer, and another jack screw would be located on the opposing side of vertical section 550. However, it is to be understood that any suitable means of raising and lowering wedge 600 may be employed, such as but not limited to, hydraulic jacks and pneumatic jacks.

Figure 7:
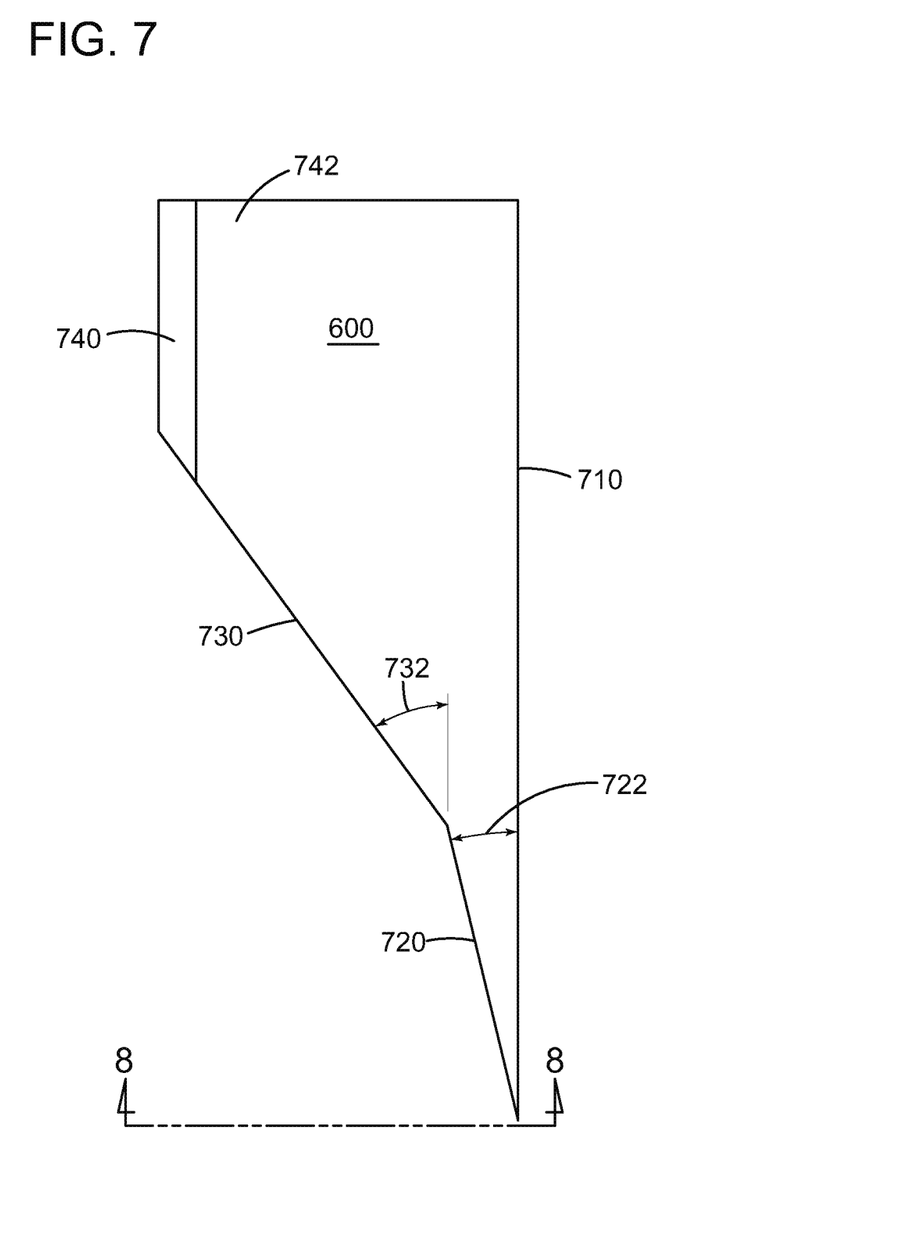
FIG. 7 illustrates a partial, simplified view of a wedge that can be used to remove a stator coil, according to an aspect of the present invention.

FIG. 7 illustrates a partial, simplified view of wedge 600. The wedge 600 includes a base surface 710 that slides along a bottom of a stator slot. The mouth 62 of the stator slot will be referred to as the top of the slot. The wedge 600 is designed as a tapered wedge, and more particularly a tapered wedge having a double taper shape. A distal portion of the wedge 600 includes a first surface 720 that forms a narrow (or first) angle with base surface 710. For example, as non-limiting examples, first angle 722 could be about 3 degrees to about 10 degrees, or about 6 degrees. A second surface 730 forms a wider (or second) angle relative to base surface 710. For example, as non-limiting examples, second angle 732 could be about 15 degrees to about 35 degrees, or about 20 degrees. This double taper shape facilitates insertion of the wedge 600 between the bottom of the stator slot and the stator winding, as well as facilitating movement of the stator winding out of the stator slot through mouth 62. Further, the wedge 600 may include a flange 740 located on one or both sides of a web portion 742 of the wedge. The web portion 742 is the part of the wedge extending below (or to the right of) flange 740, as illustrated in FIG. 7.

Figure 8:
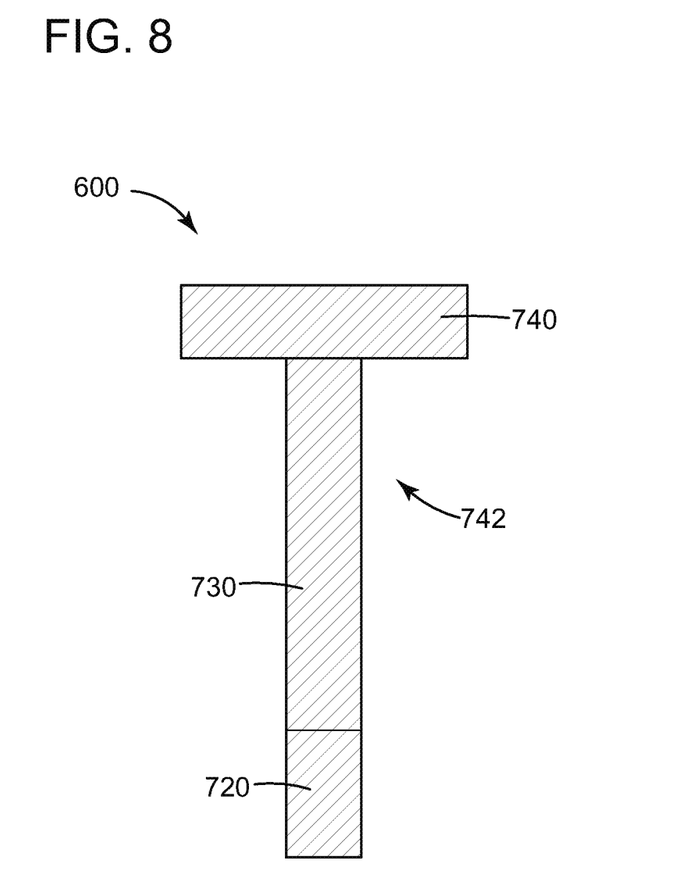
FIG. 8 illustrates a front view of the wedge that can be used to remove a stator coil, according to an aspect of the present invention.

FIG. 8 illustrates a front view of wedge 600 as taken from line 8-8 in FIG. 7. In this view, flange 740 is located at the top of wedge 600 and the web portion 742 extends below flange 740. The flange 740 may form generally a T-shape (as shown) together with part of the web 742, or an upside-down L-shape (not shown).

Figure 9:
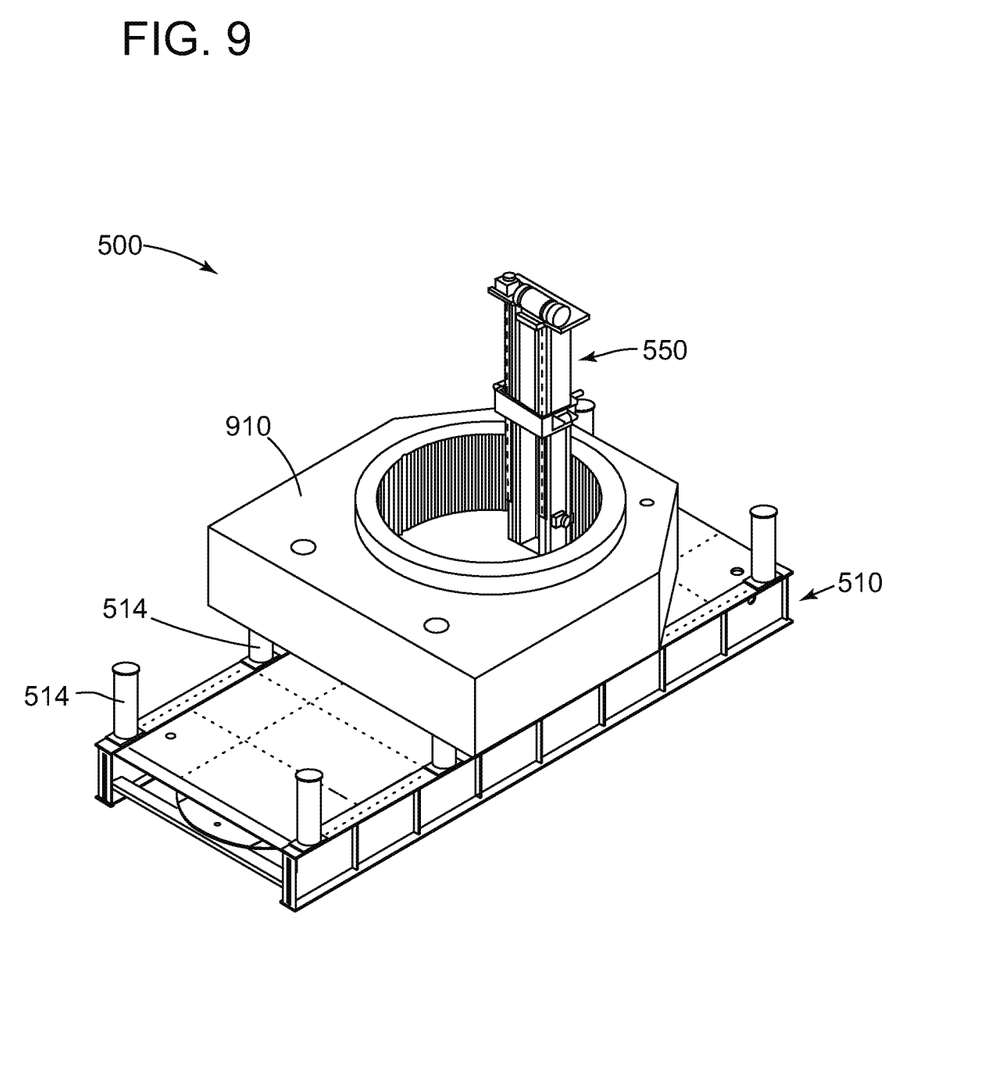
FIG. 9 illustrates one configuration of a stator core placed on a base frame and around the vertical section of the apparatus, according to an aspect of the present invention.

FIG. 9 illustrates one configuration of a stator core 910 placed on base frame 510 and around vertical section 550. The posts 514 may be placed at any suitable location and in an suitable number to support stator core 910. As one non-limiting example, four posts 514 may be used and each post 514 may be placed beneath stator core 910. The vertical section 550 is located inside stator core and can be moved radially and circumferentially. This radial "adjustability" permits the apparatus 500 to be used with a variety of differently sized stator cores, and the circumferential movement (via turntable 530) permits the vertical section 550 to be indexed around the stator core 910 so that the wedge 600 is aligned with each stator slot.

A method provided for removing a stator coil in a stator core of a dynamoelectric machine may include the steps of: providing an apparatus having a base section and a vertical section, the base section configured for supporting the stator core; placing the stator core on the base section so that at least a portion of the vertical section is inside the stator core; aligning a wedge connected to the vertical section with a stator slot; driving the wedge along the stator slot to remove the stator coil. The aligning step may also include rotating a turntable on the base section and sliding a slidable mounting platform connected to the vertical section to align the wedge with the stator slot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for removing a coil from a slot of a dynamoelectric machine, the apparatus comprising:
    a base frame having a turntable;
    a vertical section configured to be mounted on the turntable via a slidable mounting platform, the vertical section having a tapered wedge configured to move up and down the vertical section, the tapered wedge having a first surface forming a first angle with a wedge base surface and a second surface forming a second angle with respect to the wedge base surface, the second angle is greater than the first angle, wherein the first angle is between about 3 degrees to about 10 degrees and the second angle is between about 15 degrees to about 35 degrees; and
    wherein the turntable is configured to rotate at least 360 degrees, and the vertical section is configured to move in a radial direction with respect to a center of rotation of the turntable.

2. The apparatus of claim 1, wherein the first angle is about 6 degrees and the second angle is about 20 degrees.

3. The apparatus of claim 1, the tapered wedge further comprising a flange and a web portion.

4. The apparatus of claim 3, wherein the flange and the web portion are configured into a general T-shape.

5. The apparatus of claim 1, the base frame further comprising a plurality of support posts, the support posts configured for variable placement along a top rail of the base frame, and wherein the plurality of support posts are configured for supporting a part of the dynamoelectric machine.

6. The apparatus of claim 1, the vertical section further comprising:
    a wedge mount configured for supporting the tapered wedge; and
    one or more jack screws connected to the wedge mount, the one or more jack screws configured to move the wedge mount up and down along at least a portion of the vertical section.

7. The apparatus of claim 6, the vertical section further comprising:
    a motor connected to a gearbox, the gearbox connected to the one or more jackscrews.

* * * * *